(12) United States Patent
Aines et al.

(10) Patent No.: US 9,593,552 B2
(45) Date of Patent: Mar. 14, 2017

(54) CEMENTING A WELLBORE USING CEMENTING MATERIAL ENCAPSULATED IN A SHELL

(71) Applicants: LAWRENCE LIVERMORE NATIONAL SECURITY, LLC, Livermore, CA (US); APACHE CORPORATION, Houston, TX (US)

(72) Inventors: Roger D. Aines, Livermore, CA (US); William L. Bourcier, Livermore, CA (US); Eric B. Duoss, Dublin, CA (US); William C. Floyd, III, Oakland, CA (US); Christopher M. Spadaccini, Oakland, CA (US); John J. Vericella, Campaign, IL (US); Kenneth Michael Cowan, Sugar Land, TX (US)

(73) Assignees: Lawrence Livermore National Security, LLC, Livermore, CA (US); Apache Corporation, Houston, TX (US)

( * ) Notice: Subject to any disclaimer, the term of this patent is extended or adjusted under 35 U.S.C. 154(b) by 0 days.

(21) Appl. No.: 15/226,512

(22) Filed: Aug. 2, 2016

(65) Prior Publication Data
US 2016/0356119 A1 Dec. 8, 2016

Related U.S. Application Data

(62) Division of application No. 14/055,800, filed on Oct. 16, 2013, now Pat. No. 9,416,619.

(51) Int. Cl.
| | | |
|---|---|---|
| *E21B 33/13* | (2006.01) | |
| *E21B 33/00* | (2006.01) | |
| *E21B 33/138* | (2006.01) | |
| *C09K 8/44* | (2006.01) | |
| *C09K 8/467* | (2006.01) | |
| *C09K 8/02* | (2006.01) | |
| *C04B 26/20* | (2006.01) | |
| *C04B 28/02* | (2006.01) | |
| *C04B 103/00* | (2006.01) | |

(52) U.S. Cl.
CPC ............ *E21B 33/138* (2013.01); *C04B 26/20* (2013.01); *C04B 28/02* (2013.01); *C09K 8/02* (2013.01); *C09K 8/44* (2013.01); *C09K 8/467* (2013.01); *C04B 2103/0062* (2013.01)

(58) Field of Classification Search
CPC ......... E21B 33/138; C09K 8/44; C09K 8/467; C09K 8/02; C04B 26/20; C04B 28/02; C04B 2103/0062
USPC .................. 523/130; 166/292, 285
See application file for complete search history.

(56) References Cited

U.S. PATENT DOCUMENTS

| | | |
|---|---|---|
| 3,937,633 A | 2/1976 | Knight et al. |
| 4,760,882 A | 8/1988 | Novak et al. |

(Continued)

*Primary Examiner* — David Karst
(74) *Attorney, Agent, or Firm* — Eddie E. Scott

(57) ABSTRACT

A system for cementing a wellbore penetrating an earth formation into which a pipe extends. A cement material is positioned in the space between the wellbore and the pipe by circulated capsules containing the cement material through the pipe into the space between the wellbore and the pipe. The capsules contain the cementing material encapsulated in a shell. The capsules are added to a fluid and the fluid with capsules is circulated through the pipe into the space between the wellbore and the pipe. The shell is breached once the capsules contain the cementing material are in position in the space between the wellbore and the pipe.

1 Claim, 8 Drawing Sheets

(56) References Cited

U.S. PATENT DOCUMENTS

| | | | |
|---|---|---|---|
| 4,768,593 | A | 9/1988 | Novak et al. |
| 4,787,451 | A | 11/1988 | Mitchell et al. |
| 5,079,278 | A | 1/1992 | Mitchell et al. |
| 5,246,073 | A | 9/1993 | Sandiford |
| 6,011,075 | A | 1/2000 | Parris et al. |
| 6,268,406 | B1 | 7/2001 | Chatterji et al. |
| 6,780,507 | B2 | 8/2004 | Toreki et al. |
| 7,287,587 | B2 | 10/2007 | Reddy et al. |
| 7,303,014 | B2 | 12/2007 | Reddy et al. |
| 8,162,057 | B2 | 4/2012 | Lewis et al. |
| 2003/0236171 | A1 | 12/2003 | Nguyen et al. |
| 2009/0120640 | A1 | 5/2009 | Kulakofsky et al. |
| 2011/0048713 | A1 | 3/2011 | Lewis et al. |
| 2011/0237465 | A1 | 9/2011 | Lee et al. |
| 2011/0265996 | A1 | 11/2011 | Lewis et al. |

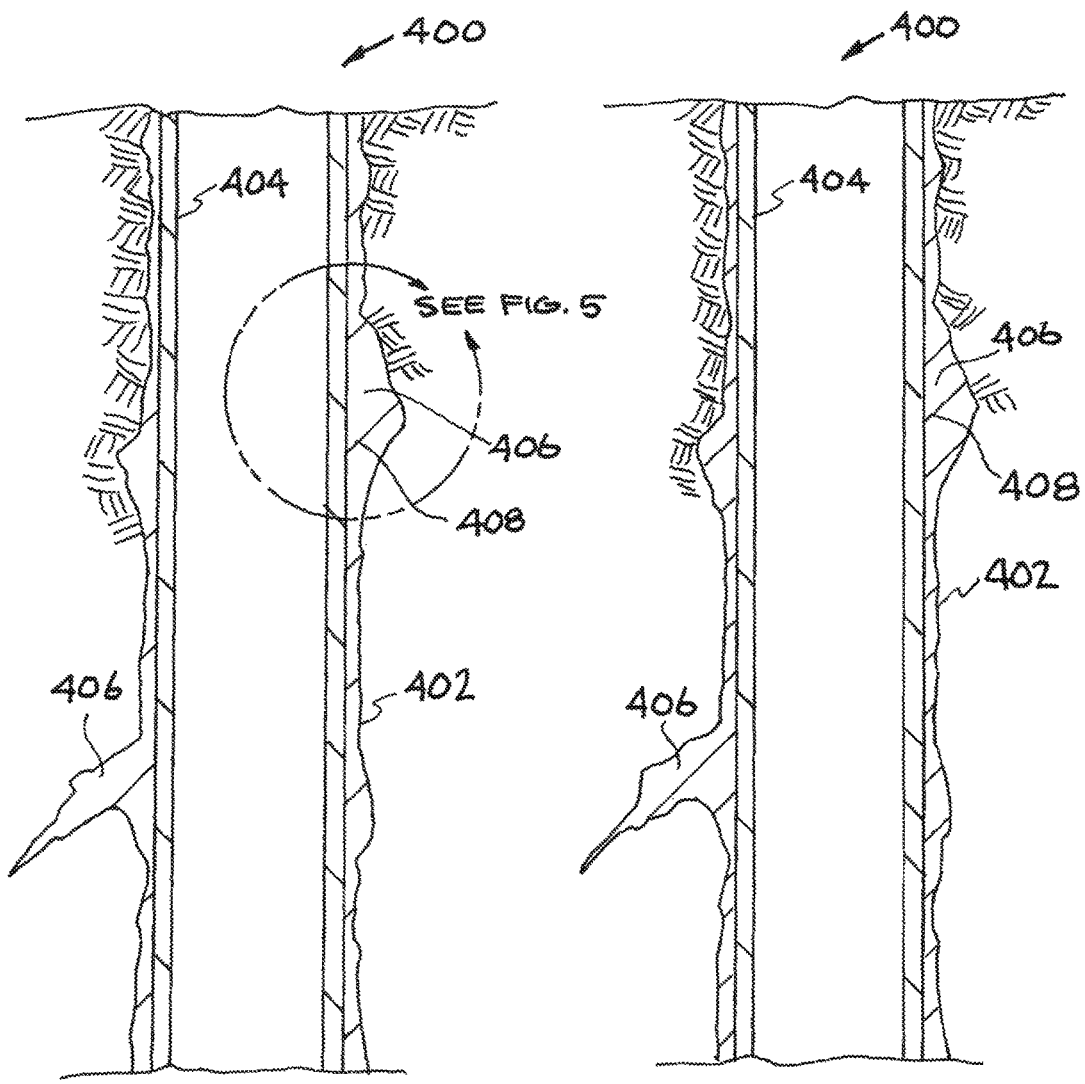

CEMENTING A WELLBORE USING CEMENTING MATERIAL ENCAPSULATED IN A SHELL

CROSS-REFERENCE TO RELATED APPLICATIONS

The present application is a Division of U.S. application Ser. No. 14/055,800 filed Oct. 16, 2013, the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to wells and cementing and more particularly to cementing a wellbore using cementing material encapsulated in a shell.

State of Technology

Cement is used to seal the annulus between the outer wall of a drilled hole, and the casing that is placed inside the hole. Obtaining a complete and strong seal in all portions of the drilled hole is challenged by a number of factors, prominently including the fact that the annulus is an irregular shape with occasional areas that are much larger than the average, or that intersect fractures and open spaces in the original formation. Compounding this is the problem that in order to emplace the cement, all of the drilling fluid (referred to as mud because of the high content of mineral additives and rock cuttings) must be removed from the annular space. This is typically done by displacing the mud with the cement compound, placing significant restrictions on the properties of the liquid cement. Any locations in which the drilling mud is not completely replaced by cement represent weak areas in the completion. This type of weakness is a known location for well failures such as that of the Macondo well in the Gulf of Mexico, where the Deepwater Horizon explosion and spill occurred in 2010.

A very large number of methods have been evolved for effective placement of cement, including the use of polymer-based cements that are activated by radiation. These can be either derived directly from a polymer-based drilling mud, or can be separate cementing agents that utilize intense radiation to initiate the hardening of the cement for a variety of timing and temperature/chemistry issues. These types of cements are described in U.S. Published Patent Application 2011/0265996 by Halliburton Law Department titled "Radiation-Induced Thickening for Set-on-Command Sealant Compositions and Methods of Use." Limitations associated with the use of radiation-induced polymer cements have not been widely documented, but the use of intense radiation sources as the setting mechanism is a strong limitation to their widespread use.

A closely related field is that of polymers for blocking permeability in fractures and high permeability zones in wells (thief zones). A considerable literature exists on the use of polymers to block these zones, generally by "gelling" in place. That formation of gel is a gradual cross linking of the polymer leading to a strong, cement-like material. However, since this material must be pumped as a liquid from the surface while it progressively gels over time, it is generally acceptable to have it form a weak cement in order to ensure that it does not set too quickly and clog the pumping equipment or well bore. The materials used for this purpose, however, appear to be usable to make stronger cements if the need to pump them quickly while still a liquid were avoided. Discussion of this patent literature can be found in U.S. Pat. No. 5,079,278 to Mobile Oil Corporation for "Enhanced Oil Recovery Profile Control with Crosslinked Anionic Acrylamide Copolymer Gels."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for cementing a wellbore penetrating an earth formation into which casing (a pipe) extends. The system places a cement material in the space between the wellbore and the pipe. The system includes circulating capsules through the pipe into the space between the wellbore and the pipe. The capsules contain the reactive portion of a cementing formulation encapsulated in a shell—the remainder of the cementing formulation is circulating freely in the drilling mud. An example of such a cementing system is the two halves of an epoxy system. The capsules are added to a fluid and the fluid with capsules is circulated through the pipe into the space between the wellbore and the pipe. The shell is breached once the capsules contain the cementing material are in position in the space between the wellbore and the pipe. The breaching of the shell can be accomplished in various ways. The shell can be breached to release the reactive portion of the cementing material by sending a signal to breach the shell at the appropriate time. The signal can be an electromagnetic pulse that causes embedding particles in the shell to absorb the electromagnetic energy and breach the shell releasing the cementing material into the space between the wellbore and the pipe. Also, the signal can be a shock wave that causes small embedded particles of energetic material in the shell to ignite and breach the shell releasing the cementing material into the space between the wellbore and the pipe. The advantage of these two methods of breaching the shell is that the timing of the setting of the cement system can be precisely controlled by the operator, and can be delayed until the optimal conditions are met (such as a confirmation that the cementing materials are completely filling the required voids via methods such as well logging). Other means for breaching the shell can be used. For example, time-sensitive shells can be used and the shells breached at a specific time to allow the capsules contain the cementing material to be put in position in the space between the wellbore and the pipe. Also, temperature-sensitive shells can be used and once the capsules contain the cementing material are in position in the space between the wellbore and the pipe, the temperature of the fluid changed by heating or cooling.

DEFINITIONS

The terms below used in this patent application have the following meanings:

Cementing: Cementing is the process of introducing cement to the annular space between the well-bore and casing or to the annular space between two successive casing strings.

Cement: Cement is material used to fill and solidify the space between the well-bore and casing or to the annular space between two successive casing strings.

Energetic Material: Energetic material is any of the family of explosives and high explosives such as TNT, PETN, TATB, which are capable of being ignited or detonated via a shock wave.

The present invention has use in oil and gas exploration and production, geothermal exploration and production, water and exploratory drilling, construction, and any other instance where there is a need to provide cement. In drilling operation cement is used to seal the annulus between the outer wall of a drilled hole and the casing that is placed inside the hole. Obtaining a complete and strong seal in all portions of the drilled hole is challenged by a number of factors, prominently including the fact that the annulus is an irregular shape with occasional areas that are much larger than the average, or that intersect fractures and open spaces in the original formation. Compounding this is the problem that in order to emplace the cement, all of the drilling fluid (referred to as mud because of the high content of mineral additives and rock cuttings) must be removed from the annular space. This is typically done by displacing the mud with the cement compound, placing significant restrictions on the properties of the liquid cement. Any locations in which the drilling mud is not completely replaced by cement represent weak areas in the completion. This type of weakness is a known location for well failures such as that of the Macondo well in the Gulf of Mexico, where the Deepwater Horizon explosion and spill occurred in 2010.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIG. 4A illustrates the system for circulating the capsules through the pipe into the space between the wellbore and the pipe in greater detail.

FIG. 4B illustrates the location of the capsules in the space between the wellbore and the pipe with the cement to harden.

DETAILED DESCRIPTION OF SPECIFIC EMBODIMENTS

Figure 1:
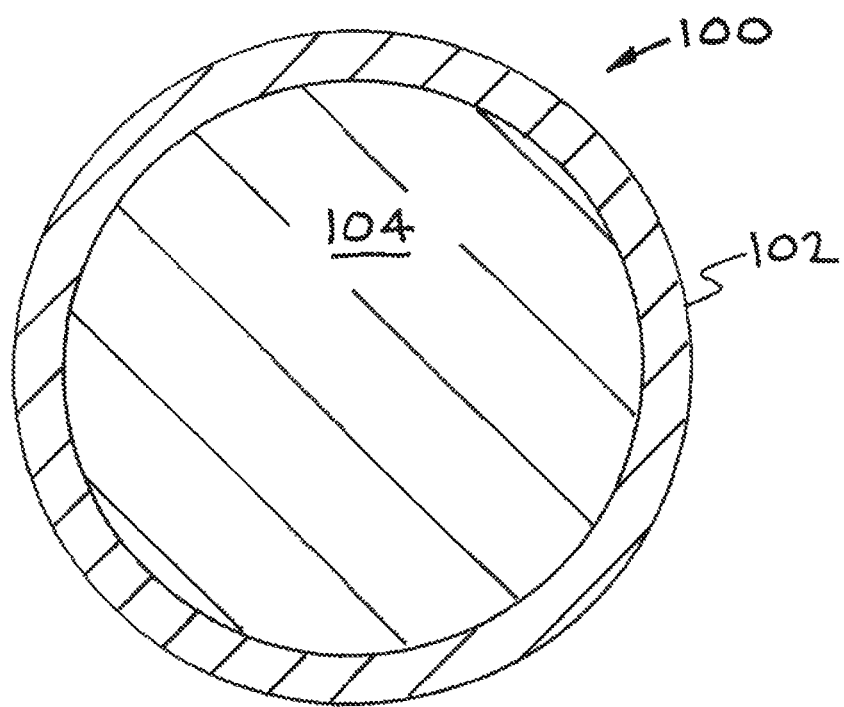
FIG. 1 illustrates an embodiment of an individual capsule.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides a system for cementing a wellbore penetrating an earth formation into which a pipe extends. The system places a cement material in the space between the wellbore and the pipe. The system includes circulating capsules through the pipe into the space between the wellbore and the pipe. The capsules contain the cementing material encapsulated in a shell. The capsules are added to a fluid and the fluid with capsules is circulated through the pipe into the space between the wellbore and the pipe. The shell is breached once the capsules contain the cementing material are in position in the space between the wellbore and the pipe.

Well Drilling and Completion

Wells are typically constructed in stages. Initially a hole is drilled in the earth to a depth at which earth cave-in or wellbore fluid control become potential issues. After that point, casing is advanced behind the drill bit or introduced into the hole in place of the drilling string. While the casing may structurally prevent cave-in, it will not prevent fluid migration along a length of the well in the annulus. For that reason, the casing is typically cemented in place. To accomplish that, a cement slurry is pumped down through the casing or drill string and back up the outside of the casing. Drilling fluid, water, or other suitable wellbore fluid can be pumped behind the cement slurry in order to displace the cement slurry into the annulus. Typically, drillable wiper plugs are used to separate the cement from the wellbore fluid in advance of the cement volume and behind it. The cement is left to cure in the annulus thereby forming a barrier to fluid migration within the annulus. Depending on the total length of well, several stages may be drilled and cased.

Cementing Wellbore using Cementing Material Encapsulated in a Shell

A major improvement in drilling would be to remove the need to replace the mud used during drilling, with cement to be used to stabilize the final well construction. In one embodiment, Applicant provides a system whereby an encapsulated crosslinking or setting agent is circulated in a drilling mud containing crosslinkable polymer such as acrylimide. When drilling is complete, an electrical or shock signal is used to break the encapsulation and release the crosslinker into the bulk fluid, causing it to solidify into a solid crosslinked polymer. The crosslinker capsules are typically on the order of 1 mm in diameter, and fully mix with the polymer-containing drilling mud. This complete mixing assures that the final solid is uniform and completely fills the space that was drilled (and was filled with mud), avoiding problems with badly cemented zones from failure to replace the mud with cement. Applicant's system will also speed well construction.

The system solves the timing problem of mixing cross linker and polymer by intimately mixing the two with the crosslinker encapsulated in a polymer shell which keeps it from reacting. At the appropriate time, the shell is disrupted, mixing the crosslinker and polymer and setting the polymer into solid cement. The encapsulated crosslinker, or other compounds which would initiate this sort of setting behavior, are added to the drilling mud at its initial use, and are therefore always completely mixed within the well. When the capsules are disrupted, the polymer cement that forms is extremely uniform and there are no poorly cemented zones as are likely to occur in conventional practice where the cement must displace drilling mud.

Referring now to the drawings and in particular to FIG. 1, an embodiment of one of the individual capsules used in the system for cementing a wellbore is shown in FIG. 1. The capsule is designated generally by the reference numeral 100. In this embodiment the capsule 100 is on the order of 1 mm in diameter. The capsule 100 includes a shell 102 and a cementing material 104 encapsulated within the shell 102. The cementing material 104 may be a crosslinking or setting agent. For example, the material 104 may be a crosslinkable polymer such as acrylamide.

A list of polymers, crosslinkers, and other agents which could be dispersed using the system of the present invention can be found in U.S. Pat. No. 5,246,073 to Dovan et al for high temperature stable gels. U.S. Pat. No. 5,246,073 is incorporated herein by this reference. These are intended as gels to control permeability but in general, such as in the case of the acrylic formulations, will form more solid cements as the proportion of cross-linker is increased. The list of polymers that can circulate in the drilling mud includes the following as listed in Dovan:

Common classes of water soluble crosslinkable polymers include polyvinyl polymers, polymethacrylamides, cellulose ethers, polysaccharides, lignosulfonates, ammonium salts thereof, alkali metal salts thereof, as well as alkaline earth salts of lignosulfonates. Specific examples of typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, galactomannans (e.g., guar gum), substituted galactomannans (e.g., hydroxypropyl guar), heteropolysaccharides obtained by the fermentation of starch-derived sugar (e.g., xanthan gum), and ammonium and alkali metal salts thereof. Preferred water soluble crosslinkable polymers include hydroxypropyl guar, partially hydrolyzed polyacrylamides, xanthan gum, polyvinyl alcohol, and the ammonium and alkali metal salts thereof.

From the same source, crosslinking agents include:

Exemplary organic crosslinking agents include, but are not limited to, aldehydes, dialdehydes, phenols, substituted phenols, and ethers. Phenol, resorcinol, catechol, phloroglucinol, gallic acid, pyrogallol, 4,4'-diphenol, 1,3-dihydroxynaphthalene, 1,4-benzoquinone, hydroquinone, quinhydrone, tannin, phenyl acetate, phenyl benzoate, 1-naphthyl acetate, 2-naphthyl acetate, phenyl chloroacetate, hydroxyphenylalkanols, formaldehyde, paraformaldehyde, acetaldehyde, propionaldehyde, butyraldehyde, isobutyraldehyde, valeraldehyde, heptaldehyde, decanal, glyoxal, glutaraldehyde, terephthaldehyde, hexamethylenetetramine, trioxane, tetraoxane, polyoxymethylene, and divinylether are some of the more typical organic crosslinking agents. Typical inorganic crosslinking agents are polyvalent metals, chelated polyvalent metals, and compounds capable of yielding polyvalent metals. Some of the more common inorganic crosslinking agents include chromium salts, aluminates, gallates, titanium chelates, aluminum citrate, chromium citrate, chromium acetate, chromium propionate, and zirconium chelates or complexes. Individual or mixtures of crosslinking agents are used in the present.

Dovan also lists surfactants and other treatments that could be dispersed along with the crosslinker, either in the same capsule as chemistry permits, or in a separate class of capsules circulated along with those containing crosslinker.

The U.S. Pat. No. 6,011,075 to Huggins et al for enhancing gel strength describes extensively the chemistries used in the present invention. The patent uses colloidal material to delay the setting of the gel/cements. U.S. Pat. No. 6,011,075 is incorporated herein by this reference.

Figure 2:
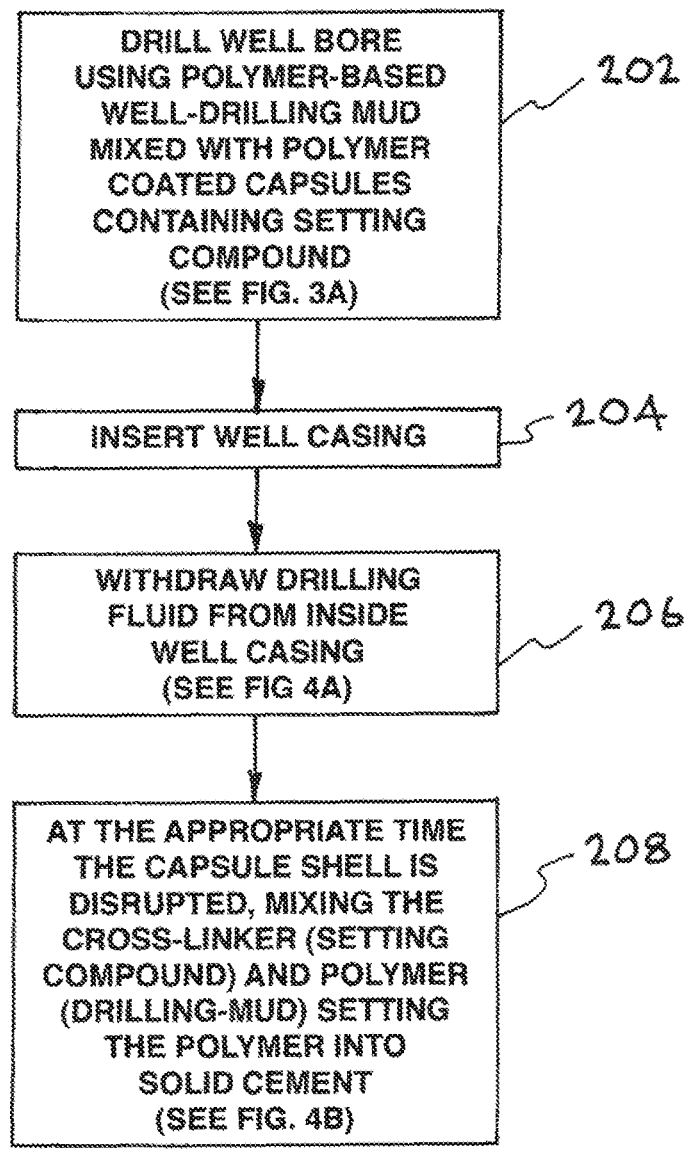
FIG. 2 is a flow chart illustrates a system representing an example of one embodiment of the present invention.

Referring now to FIG. 2, a flow chart illustrates a system representing an example of one embodiment of the present invention. The system is designated generally by the reference numeral 200. The system 200 is a system for cementing a wellbore penetrating an earth formation into which a pipe extends. The system places a cement material in the space between the wellbore and the pipe. The system 200 includes the steps shown in the flow chart that are described in greater detail below.

In the step identified by the reference numeral 202 the wellbore is drilled using polymer-based well-drilling mud mixed with polymer coated capsules containing a setting compound. It is to be understood that the capsules can be introduced to the circulating drilling fluid (mud) at any time, as it may be advantageous to add them just before cementing is required to optimize the rheology of the drilling fluid or minimize damage to the capsules by the drill bit or other forces. Similarly it may be useful to add small amounts of the capsules early in the process to ensure complete distribution, and then increase their concentration near the time of cementing. The system 200 includes circulating capsules through the pipe into the space between the wellbore and the pipe. The capsules contain the cementing material encapsulated in a shell. The capsules are added to a fluid and the fluid with capsules is circulated through the pipe into the space between the wellbore and the pipe. This step is illustrated and described in greater detail in connection with FIG. 3A.

In the step identified by the reference numeral 204 a well casing is inserted into the borehole.

In the step identified by the reference numeral 206 drilling fluid is withdrawn from the space between the casing and the borehole to allow the well-drilling mud mixed with polymer coated capsules containing a setting compound to fill the space between the casing and the borehole. This step is illustrated and described in greater detail in connection with FIG. 4A.

In the step identified by the reference numeral 208, at the appropriate time the capsules shell are disrupted, mixing the crosslinker (setting compound) and polymer (drilling-mud)

setting the polymer into the solid cement. The shell is breached once the capsules contain the cementing material are in position in the space between the wellbore and the pipe. The breaching of the shell can be accomplished in various ways. The shell can be breached to release the cementing material by sending a signal to breach the shell at the appropriate time. The signal can be an electromagnetic pulse that causes embedding particles in the shell to absorb the electromagnetic energy and breach the shell releasing the cementing material into the space between the wellbore and the pipe. Also, the signal can be a shock wave that causes small embedded particles of energetic material in the shell to ignite and breach the shell releasing the cementing material into the space between the wellbore and the pipe. Other means for breaching the shell can be used. For example, time-sensitive shells can be used and the shells breached at a specific time to allow the capsules contain the cementing material to be put in position in the space between the wellbore and the pipe. Also, temperature-sensitive shells can be used and once the capsules contain the cementing material are in position in the space between the wellbore and the pipe, the temperature of the fluid changed by heating or cooling. This step is illustrated and described in greater detail in connection with FIG. 4B.

The capsules of the present invention can also be used to disperse surfactants, stabilizing agents, and chemical treatments designed in general to promote the setting and hardening of the cementing formulation, but which are not actively part of the cement chemistry.

Figure 3A:
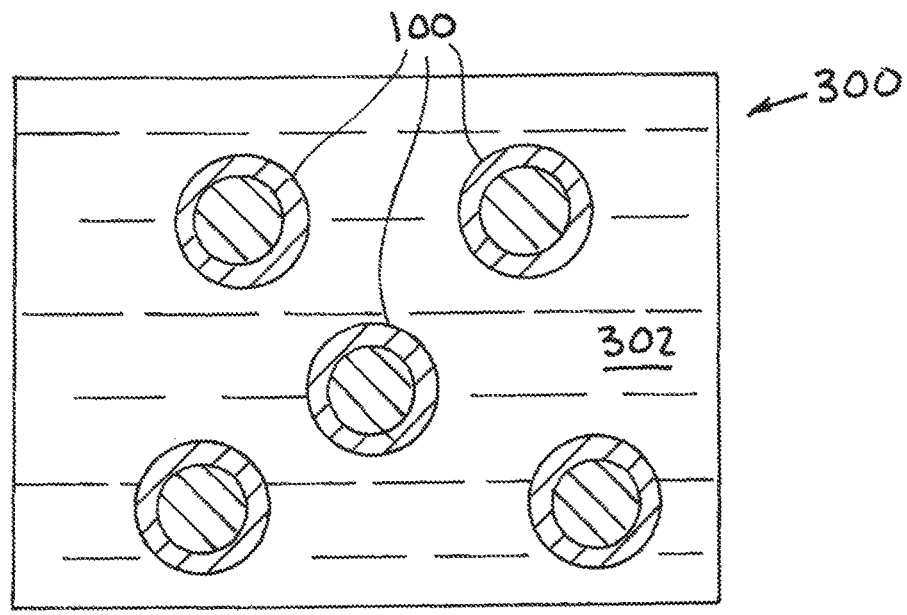
FIG. 3A illustrates the polymer-based well-drilling mud mixed with polymer coated capsules containing a setting compound.

Referring now to FIG. 3A, the polymer-based well-drilling mud mixed with polymer coated capsules containing a setting compound is illustrated in greater detail as designated by the reference numeral 300. The polymer-based well-drilling mud 302 and polymer coated capsules 100 containing a setting compound are mixed. The system involves circulating the capsules 100 through the pipe into the space between the wellbore and the pipe. The capsules 100 contain the cementing material encapsulated in a shell. The capsules are added to a fluid and the fluid with capsules is circulated through the pipe into the space between the wellbore and the pipe.

Figure 3B:
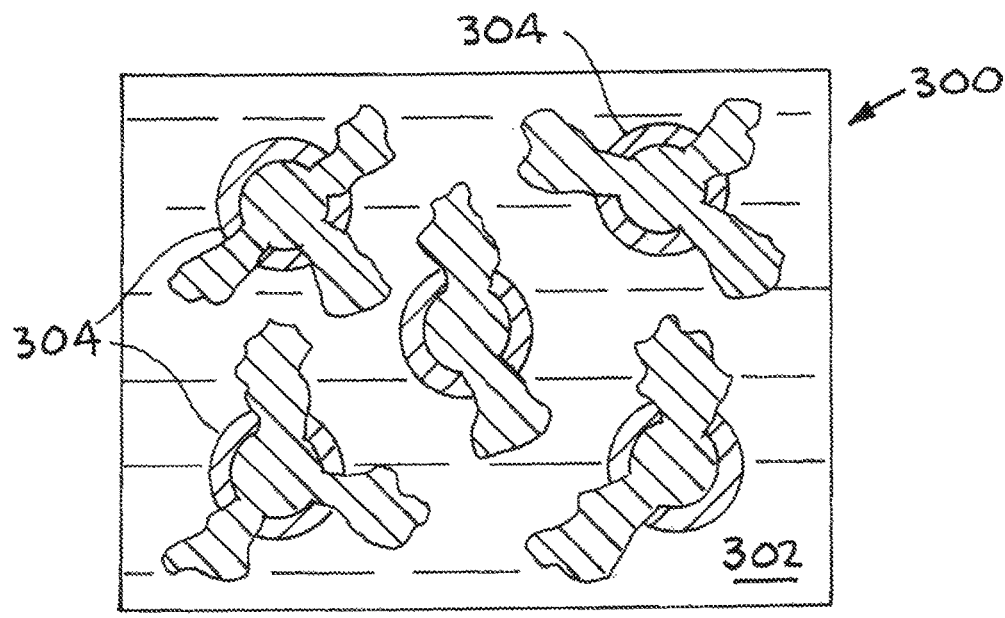
FIG. 3B illustrates the disruption of the polymer coated capsules releasing the setting compound.

Referring now to FIG. 3B, the disruption of the polymer coated capsules releasing the setting compound is illustrated as designated by the reference numeral 300. At the appropriate time the capsules shells 304 are disrupted, mixing the crosslinker (setting compound) and polymer (drilling-mud) setting the polymer into the solid cement. The shell 304 is breached once the capsules contain the cementing material are in position in the space between the wellbore and the pipe. The breaching of the shell can be accomplished in various ways. The shell can be breached to release the cementing material by sending a signal to breach the shell at the appropriate time. The signal can be an electromagnetic pulse that causes embedding particles in the shell to absorb the electromagnetic energy and breach the shell releasing the cementing material into the space between the wellbore and the pipe. Also, the signal can be a shock wave that causes small embedded particles of energetic material in the shell to ignite and breach the shell releasing the cementing material into the space between the wellbore and the pipe. Other means for breaching the shell can be used. For example, time-sensitive shells can be used and the shells breached at a specific time to allow the capsules contain the cementing material to be put in position in the space between the wellbore and the pipe. Also, temperature-sensitive shells can be used and once the capsules contain the cementing material are in position in the space between the wellbore and the pipe, the temperature of the fluid changed by heating or cooling. This step is illustrated and described in greater detail in connection with FIG. 4B.

Referring now to FIG. 4A, the system for circulating the capsules through the pipe into the space between the wellbore and the pipe is illustrated. The system is designated generally by the reference numeral 400. The system 100 places a cement material in the space between the wellbore 402 and the pipe 404. The system includes circulating capsules through the pipe into the space between the wellbore and the pipe. The capsules contain the cementing material encapsulated in a shell. The capsules are added to a fluid and the fluid with capsules is circulated through the pipe into the space between the wellbore and the pipe.

The present invention has use in oil and gas exploration and production, geothermal exploration and production, water and exploratory drilling, construction, and any other instance where there is a need to provide cement. In drilling operations cement is used to seal the annulus between the outer wall of a drilled hole and the casing that is placed inside the hole. Obtaining a complete and strong seal in all portions of the drilled hole is challenged by a number of factors, prominently including the fact that the annulus is an irregular shape with occasional areas that are much larger than the average, or that intersect fractures and open spaces in the original formation. This is illustrated by open spaces 406 shown in FIG. 4A. Any location, such as open spaces 406, in which the drilling mud is not completely replaced by cement represent weak areas. This type of weakness is a known location for well failures.

The shell of the capsules is breached once the capsules contain the cementing material are in position in the space between the wellbore 402 and the pipe 404. The breaching of the shell can be accomplished in various ways. The shell can be breached to release the cementing material by sending a signal to breach the shell at the appropriate time. The signal can be an electromagnetic pulse that causes embedding particles in the shell to absorb the electromagnetic energy and breach the shell releasing the cementing material into the space between the wellbore and the pipe. Also, the signal can be a shock wave that causes small embedded particles of energetic material in the shell to ignite and breach the shell releasing the cementing material into the space between the wellbore and the pipe. Other means for breaching the shell can be used. For example, time-sensitive shells can be used and the shells breached at a specific time to allow the capsules contain the cementing material to be put in position in the space between the wellbore and the pipe. Also, temperature-sensitive shells can be used and once the capsules contain the cementing material are in position in the space between the wellbore and the pipe, the temperature of the fluid changed by heating or cooling.

Figure 5:
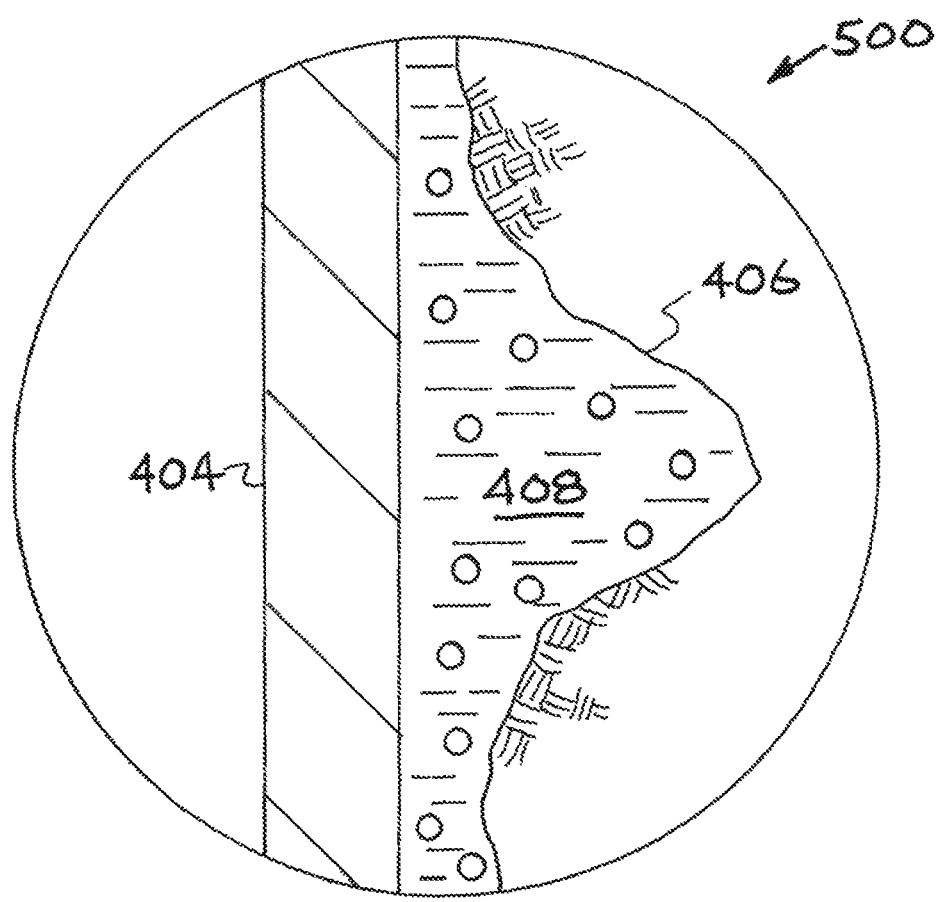
FIG. 5 is the section in the dashed circle of FIG. 4A.

One of the irregularities 406 is shown in greater detail in FIG. 5. The dashed circle in FIG. 4A shows the area that is shown in greater detail in FIG. 5.

Referring now to FIG. 4B, the location of the capsules in the space between the wellbore and the pipe with the cement to harden is illustrated. The system is designated generally by the reference numeral 400. The system 100 places a cement material 408 in the space between the wellbore 402 and the pipe 404.

Referring now to FIG. 5 is an enlarged view of the location of the cement 408 in the space between the wellbore 402 and the pipe 404 with the cement harden is illustrated. The system is designated generally by the reference numeral 500. The system 500 places a cement material 408 in the open space 406 between the wellbore 402 and the pipe 404.

Capsule Making System

Figure 6:
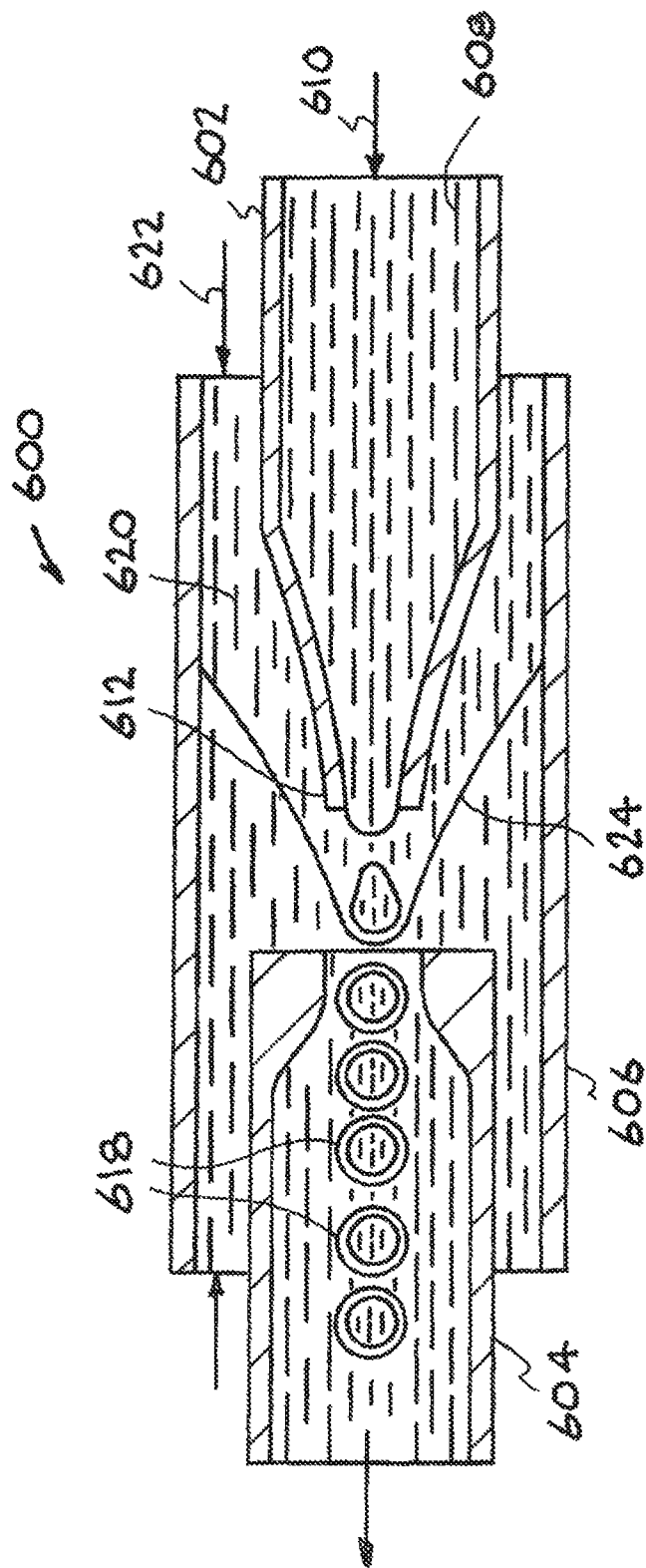
FIG. 6 illustrates the capsule making system.

Referring now to FIG. 6 a system for making polymer coated microcapsules containing energetic material is illustrated. The system for making encapsulated cement material is designated generally by the reference numeral 600. The schematically illustrated system 600 is composed of the following items. The injection tube 602, a collection tube 604, and an outer tube 606.

In operation the inner fluid 608 flows in the injection tube 602 in the direction indicated by arrow 610. As this fluid proceeds it passes thru a droplet forming nozzle 612. The formed droplet is released from the nozzle and becomes encased in the middle fluid 614, the middle fluid 614 is flowing in the direction indicated by arrow 616. The droplet in the middle fluid 614 becomes encased in the middle fluid 614 forming encapsulated microcapsules 618 that have cement material in a core with a thin outer shell. The outer fluid flows in the outer tube 606 in the direction indicated by arrow 622. This outer fluid 620 carries the fabricated microcapsules 618 into the collection tube 604. There is a boundary layer 624 that prevents the middle fluid 614 and outer fluid 620 from mixing as they have a large difference in both their viscosity and flow rates. The above described method will produce encapsulated cement material of a controlled size enclosed in a shell.

Systems for producing microcapsules are described in U.S. Pat. No. 7,776,927 and in U.S. Published Patent Application Nos. 2009/0012187 and 2009/0131543. U.S. Pat. No. 7,776,927 to Liang-Yin Chu et al, assigned to the President and Fellows of Harvard College, discloses emulsions and the production of emulsions, including multiple emulsions and microfluidic systems for producing multiple emulsions. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0012187 to Liang-Yin Chu et al, assigned to the President and Fellows of Harvard College, discloses multiple emulsions, and to methods and apparatuses for making emulsions, and techniques for using the same. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0131543 to David A. Weitz discloses multiple emulsions, and to methods and apparatuses for making multiple emulsions. A multiple emulsion, as used herein, describes larger droplets that contain one or more smaller droplets therein. The larger droplet or droplets may be suspended in a third fluid in some cases. In certain embodiments, emulsion degrees of nesting within the multiple emulsion are possible. For example, an emulsion may contain droplets containing smaller droplets therein, where at least some of the smaller droplets contain even smaller droplets therein, etc. Multiple emulsions can be useful for encapsulating species such as pharmaceutical agents, cells, chemicals, or the like. In some cases, one or more of the droplets (e.g., an inner droplet and/or an outer droplet) can change form, for instance, to become solidified to form a microcapsule, a lipo some, a polymero some, or a colloid some. As described below, multiple emulsions can be formed in one step in certain embodiments, with generally precise repeatability, and can be tailored to include one, two, three, or more inner droplets within a single outer droplet (which droplets may all be nested in some cases). As used herein, the term "fluid" generally means a material in a liquid or gaseous state. Fluids, however, may also contain solids, such as suspended or colloidal particles. U.S. Pat. No. 7,776,927 and U.S. Published Patent Application Nos. 2009/0012187 and 2009/0131543 are incorporated herein by this reference.

The present invention provides benefits in fabrication and manufacturability. The encapsulated cement material can be fabricated at a size small enough for efficient mass transfer and large enough for ease of handling. The present invention provides methods to fabricate cement material filled shells. The present invention provides benefits in survivability and robustness.

Figure 7:
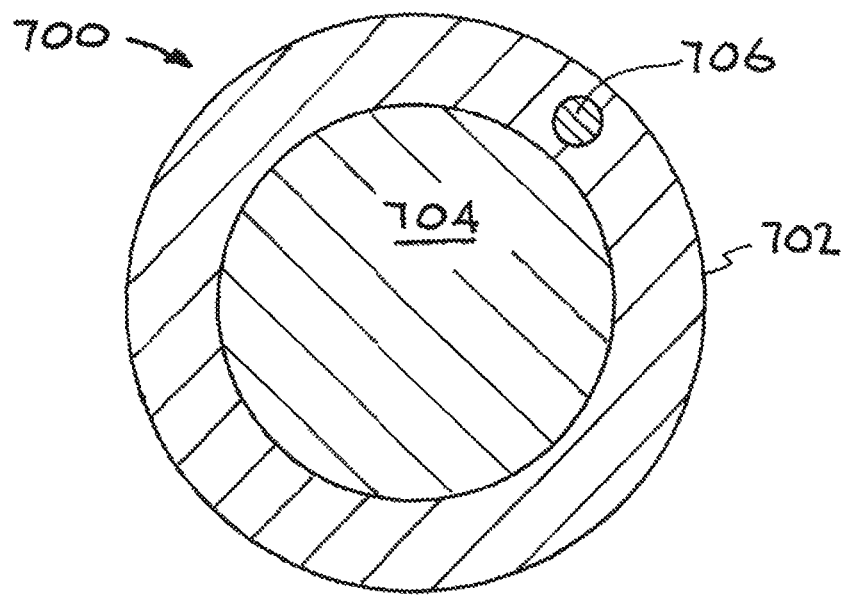
FIG. 7 illustrates one embodiment of a capsule having a shell.

Referring now to FIG. 7, another embodiment of an individual capsule used in the system for cementing a wellbore is shown. The capsule is designated generally by the reference numeral 700. In this embodiment the capsule 700 includes a shell 702 and a cementing material 704 encapsulated within the shell 702. An energetic material 706 is embedded within the shell 702.

The system for cementing a wellbore includes circulating the capsules 700 through the pipe into the space between the wellbore and the pipe. The capsules 700 contain the reactive cementing formulation 704 encapsulated in the shell 702. The shell 702 is breached once the capsules 700 contain the cementing material 704 are in position in the space between the wellbore and the pipe. The breaching of the shell 702 is be accomplished by a shock wave that causes the embedded particles 706 of energetic material in the shell 702 to ignite and breach the shell 702 releasing the cementing material 704 into the space between the wellbore and the pipe.

The shock wave for causing the embedded particles 706 of energetic material in the shell 702 to ignite can be produced by a number of systems. For example, the system could be a "gun" with small explosive charges, similar to a perforation gun used in the oil industry. The gun would be fired to create shock waves in the drilling mud that travel to the capsules 700 and cause the energetic materials 706 in the capsules 700 to ignite, rupturing the shell 702, releasing the cementing material 704 into the space between the wellbore and the pipe.

Figure 8:
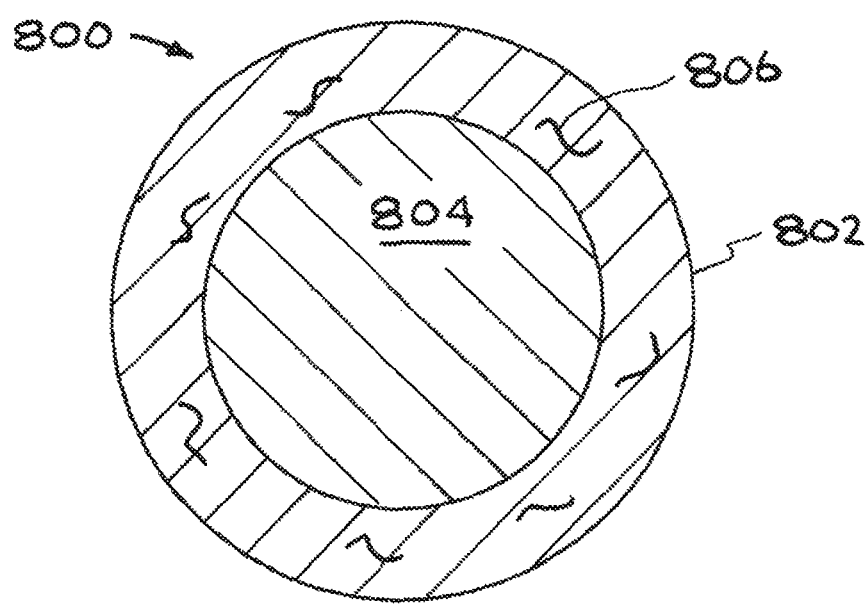
FIG. 8 illustrates another embodiment of a capsule having a shell.

Referring now to FIG. 8, another embodiment of one of an individual capsules used in the system for cementing a wellbore is shown. The capsule is designated generally by the reference numeral 800. In this embodiment the capsule 800 includes a shell 802 and a cementing material 804 encapsulated within the shell 802. An electromagnetic absorber material 806 is embedded within the shell 802.

The system for cementing a wellbore includes circulating the capsules 800 through the pipe into the space between the wellbore and the pipe. The capsules 800 contain the reactive cementing formulation 804 encapsulated in the shell 802. The shell 802 is breached once the capsules 800 contain the cementing material 804 are in position in the space between the wellbore and the pipe. The breaching of the shell 802 is be accomplished by a strong electromagnetic pulse that causes the embedded electromagnetic absorber material 806 in the shell 802 to react and breach the shell 802 releasing the cementing material 804 into the space between the wellbore and the pipe.

The strong electromagnetic pulse for causing the embedded electromagnetic absorber material in the shell 802 to react can be produced by a number of systems. For example, the system could be a device that produces a strong electromagnetic pulse tuned to penetrate the correct distance through the drilling mud and then be absorbed by the electromagnetic absorber material 806 in the shell 802 of the capsule 800 causing the shell 802 to rupture.

Oil Well Cementing—Capsules Containing Cement Material

Figure 9:
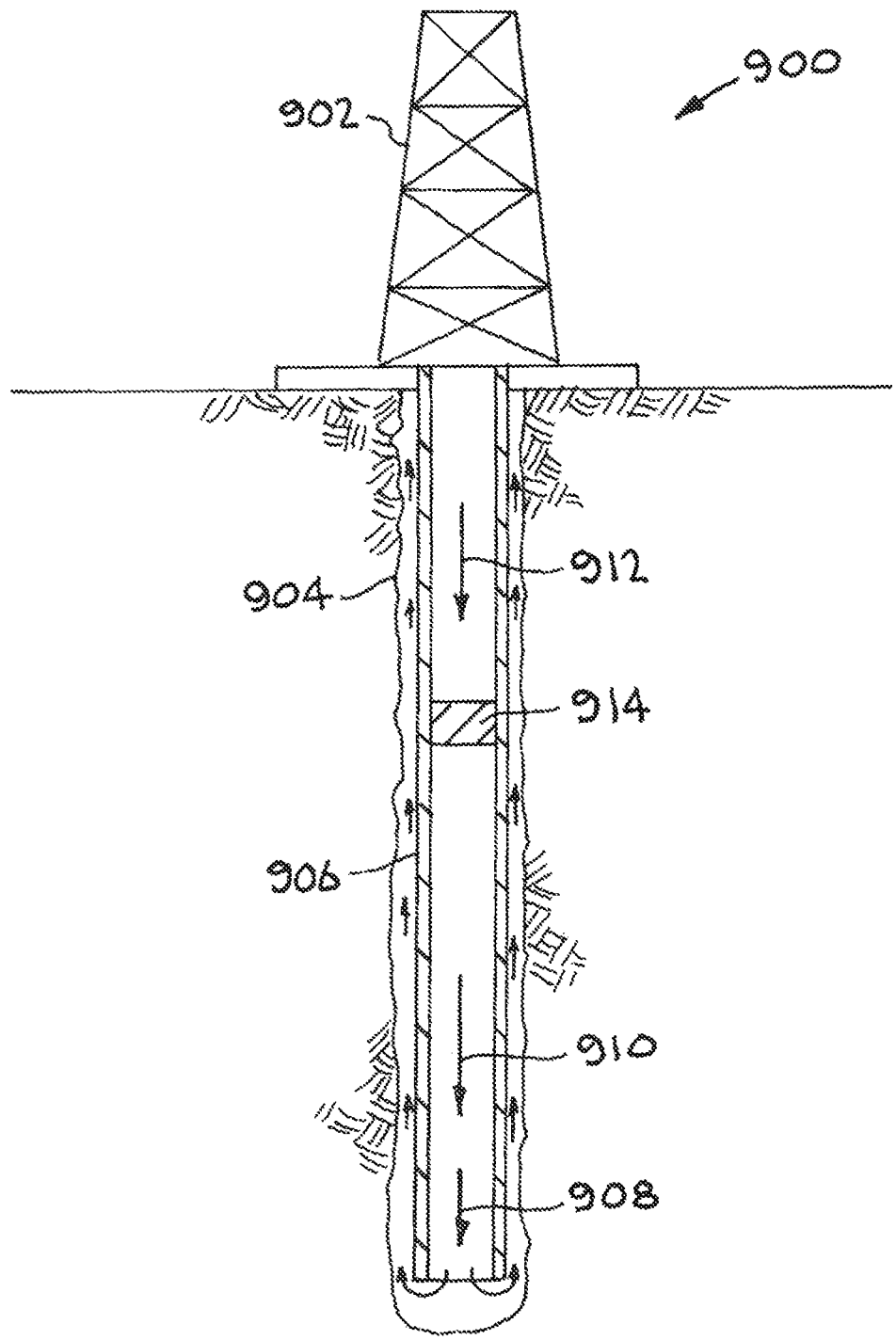
FIG. 9 illustrates an oil well cementing system that circulates capsules containing cement material through the pipe into the space between the wellbore and the pipe.

Referring now to FIG. 9, an oil well cementing system that circulates capsules containing cement material through the pipe into the space between the wellbore and the pipe is illustrated. The system is designated generally by the reference numeral 900.

A drilling rig 902 is shown positioned for drilling a borehole 904 using a drill pipe 906. Drilling mud 908 is used to assist in the actual drilling and is used for circulating the encapsulated cement material 910. The cement material 910 is pumped to the bottom of the borehole 904 and then back up through the annular space between the drill pipe 906 and the borehole 904. The cement material 910 can also be pumped through a casing in place of the drill pipe 906. The cement material 910 is pumped to the bottom of the borehole 904 and then back up through the annular space between the casing and the borehole 904. Displacement fluid 912, such as fresh water, sea water, and weak acid solutions, is used to push the cement material 910 into position.

In this example Applicants use encapsulation of inorganic acid-base cement components to enable cementing of the borehole 904. Inorganic cements such as those containing phosphate and sulfate and other elements can be generated by mixing of acidic and basic precursors. For example an acidic solution of magnesium chloride will react with a basic solution of sodium phosphate and ammonia to produce hydrous magnesium phosphate phases with cementitious properties. Such phases are known to harden rapidly over time periods of a few hours or less.

The well-drilling mud 908 is mixed with polymer coated capsules containing a concentrated solution of magnesium chloride. Alternatively, the capsules contain a solid magnesium chloride hydrate which is prepared using a system for production of encapsulated solids. Furthermore, the drilling mud 904 is mixed with a basic (pH 9 or greater) solution of phosphate and ammonia. The fluid with capsules is circulated through the pipe 906 into the space between the wellbore 904 and the pipe 906.

Disruption of the polymer coated capsules releasing the acid cement compound designated by the reference numeral 910. At the appropriate time the capsules shells are disrupted, mixing the acid (magnesium chloride) and base (solution of phosphate and ammonia mixed into the drilling fluid) and causing formation of magnesium ammonium phosphate cement. The shell is breached once the capsules contain the cementing material are in position in the space between the wellbore 904 and the pipe 906. The breaching of the shell can be accomplished in various ways. The signal can be an electromagnetic pulse that causes embedding particles in the shell to absorb the electromagnetic energy and breach the shell releasing the cementing material into the space between the wellbore 904 and the pipe 906. Also, the signal can be a shock wave that causes small embedded particles of energetic material in the shell to ignite and breach the shell releasing the cementing material into the space between the wellbore 904 and the pipe 906.

Other means for breaching the shell can be used. For example, the encapsulated acidic magnesium chloride solution when emplaced in an aqueous solution of lower salinity will be subject to an osmotic pressure across the polymer that will force water into the capsule. If the polymer capsule shell is semi-permeable to water, the water will be forced to enter the capsule causing swelling and eventually breakage of the capsule wall if the osmotic pressure is sufficiently large. The osmotic pressure can be regulated by varying the salinity of the drilling fluid, and the salinity of the encapsulated material.

Other acid-base cements can be utilized with this methodology. Phases such as ettringite, a common mineral component of Portland cements, is composed of oxides of calcium, aluminum, and sulfate. Ettringite can be generated by reacting an acidic mixture of calcium and aluminum chloride with a basic solution of sodium sulfate. For use in borehole cementing, the acidic solution of calcium and aluminum chloride is encapsulated, and the basic solution of sodium sulfate is mixed into the drilling fluid. The fluid with capsules is circulated through the pipe into the space between the wellbore and the pipe. The polymer shell is then breached once the capsules contain the cementing material are in position in the space between the wellbore 904 and the pipe 906. The breaching of the shell can be accomplished in various ways as described above.

Another manifestation of this process is to encapsulate dry powders that are composed of the cementing material precursors such that they will crystallize into cementing phases upon reaction with water. The polymer capsule shell in this case must be impervious to water. For example, the polymer could be Norland Optical Adhesive. The polymer capsule is created containing a mixture of aluminum chloride, ammonium hydroxide, and sodium phosphate dry powders. These capsules are then mixed into the drilling fluid. The fluid with capsules is circulated through the pipe into the space between the wellbore and the pipe. The polymer shell is then breached once the capsules containing the cementing material are in position in the space between the wellbore and the pipe. Water enters the capsules and causes a chemical reaction between the constituents which gives rise to cementing phases. The breaching of the shell can be accomplished in various ways as described above.

Mineral cement—MgPO4 cements are commonly used in road repair. They are created by combining MgO powder and ammonium phosphate, with water. In the example of using this as a cementing system, both dry components would be contained inside the capsule shell which is impervious to water, made from a polymer such as Norland Optical Adhesive. Upon rupturing the shell the cement is exposed to water and hardens rapidly.

Cementing at Construction Sites

The present invention has use in cementing at construction sites. The present invention has where one does not want the cement to set up until a precise time including large forms, structures that must be inspected for complete filling before setting, or structures in which other systems must be emplaced before setting. The present invention provides a composition for use in a cementing process wherein the cement sets at a predetermined time. The composition includes a circulating fluid, capsules in the circulating fluid, a setting material encapsulated in the capsules, and a system for releasing the setting material from the capsules so that the cement sets at a predetermined time.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of cementing a wellbore penetrating an earth formation into which a conduit extends, said wellbore having a space between the wellbore and the conduit, comprising the steps of:
   circulating a drilling mud containing a setting material encapsulated in capsules through the conduit into the space between the wellbore and the conduit wherein said capsules have a shell with embedded particles of energetic material, and
   releasing said setting material encapsulated in capsules from said capsules into the space between the wellbore and the conduit thereby cementing the wellbore, wherein said step of releasing said setting material encapsulated in capsules from said capsules comprises sending a shock signal for igniting said particles of energetic material embedded in said shell of said capsules thereby breaching said shell and releasing said setting material from said capsules.

* * * * *